United States Patent [19]

Heitz et al.

[11] 4,412,063
[45] Oct. 25, 1983

[54] POLYTETRAHYDROFURANS CONTAINING TERMINAL ACRYLATE OR METHACRYLATE GROUPS

[75] Inventors: Walter Heitz, Kirchhain; Hans-Jürgen Kress, Giessen; Wolfgang Stix, Krefeld, all of Fed. Rep. of Germany

[73] Assignee: Bayer Aktiengesellschaft, Leverkusen, Fed. Rep. of Germany

[21] Appl. No.: 364,986

[22] Filed: Apr. 2, 1982

Related U.S. Application Data

[63] Continuation-in-part of Ser. No. 229,094, Jan. 28, 1981, abandoned.

[30] Foreign Application Priority Data

Feb. 6, 1980 [DE] Fed. Rep. of Germany ....... 3004328

[51] Int. Cl.$^3$ ...................... C07C 67/26; C08G 65/20
[52] U.S. Cl. ..................... 528/409; 560/209
[58] Field of Search ...................... 528/408, 409, 417; 560/209, 224

[56] References Cited

U.S. PATENT DOCUMENTS 3,660,532  5/1972  Werner et al. ................. 528/302 X
3,864,287  2/1975  Matsuda et al. ................ 528/417 X
4,127,513  11/1978 Bellis ................................ 528/413
4,163,115  7/1979  Heinsohn et al. .............. 568/617 X
4,189,566  2/1980  Mueller et al. ..................... 528/408
4,259,531  3/1981  Huchler et al. ..................... 568/617

OTHER PUBLICATIONS

Berlin et al., "Synthesis of Low Molecular Weight Polyoxytetramethylenes with Methacrylate End Groups", Polymer Science U.S.S.R. 9, 1485–1489 (1967)
Turovskaya et al., "Copolymerization of Tetrahydrofuran with Propylene Oxide in the Presence of Methacrylic Anhydride" Polymer Science U.S.S.R. 15, 2074–2079 (1973).

Primary Examiner—Earl A. Nielsen
Attorney, Agent, or Firm—Connolly and Hutz

[57] ABSTRACT

Polytetrahydrofurans containing terminal acrylate or methacrylate groups and having a molecular weight of from 200 to 10,000 and a process for producing such polytetrahydrofurans by homopolymerizing tetrahydrofuran, optionally in an organic solvent, together with acrylic acid anhydride and/or methacrylic acid anhydride and with the aid of a catalyst. The polytetrahydrofuran can be used as rubbers.

2 Claims, No Drawings

POLYTETRAHYDROFURANS CONTAINING TERMINAL ACRYLATE OR METHACRYLATE GROUPS

CROSS REFERENCE TO RELATED APPLICATION

This application is a continuation-in-part of application Ser. No. 229,094 filed Jan. 28, 1981 and now abandoned.

This invention relates to a process for the production of polytetrahydrofurans containing terminal acrylate and/or methacrylate groups in which tetrahydrofuran, optionally in an inert organic solvent, is homopolymerized at a temperature of from −10° to +70° C. with the aid of from 0.001 to 5% by weight, preferably from 0.05 to 5% by weight, based on tetrahydrofuran, of a catalyst and together with from 0.1 to 200% by weight, based on tetrahydrofuran, of acrylic acid anhydride or methacrylic acid anhydride.

It is known that tetrahydrofuran can be homopolymerized in the presence of carboxylic acid anhydrides (German Offenlegungsschrift No. 2,709,280). For example, this reaction may be carried out in the presence of acetic acid anhydride, resulting in the formation of polytetrahydrofurans containing terminal acetate groups. The transfer reaction required where polytetrahydrofuran is homopolymerized in the presence of acid anhydrides is controlled in its extent by the nucelophilic character of the acid anhydride. Since the $pK_s$-value of (meth)acrylic acid is considerably lower than that of acetic acid, an adequate transfer reaction is unlikely to occur, even where acrylic acid or methacrylic acid anhydride is used. Because of this, it is surprising that particularly good results should be obtained where this reaction is carried out precisely with acrylic acid anhydride or methacrylic acid anhydride. This is because the acid anhydride is almost completely consumed at the end of the reaction. The molecular weight (determined by the well-known vapor-pressure osmotic methods) of the polymers may be adjusted to between 200 and 10.000 by varying the reaction conditions such as the concentration of tetrahydrofuran, the quantity of acrylic acid or methacrylic acid anhydride and by suitably selecting the temperature. It is also possible to homopolymerize tetrahydrofuran alone to form high molecular weight products, in a first stage and subsequently to react this product with acrylic acid anhydride and/or methacrylic acid anhydride in the presence of catalysts in order to reduce its molecular weight and to incorporate the terminal acrylate or methacrylate groups. The products obtained by the process according to the invention have a functionality of unsaturated ester groups of the order of 2.

Inert organic solvents suitable for use in the process are, for example, chlorinated hydrocarbons, such as methylene chloride and carbon tetrachloride, or nitro compounds, such as nitromethane. In general, the solutions of the tetrahydrofuran in these solvents have a concentration of at least 10% by weight, the highest concentration which may be used being pure tetrahydrofuran.

Suitable catalysts are any which catalyse the cationic polymerization of tetrahydrofuran, such as fluorosulphonic acid, perchloric acid, $HSbF_6$, salts containing acyl or trialkyl oxonium ions, phosphorus pentafluoride and trifluoromethyl sulphonic acids (for example polymeric perfluorinated aliphatic sulphonic acids of the type commercially available under the name of Nafion. Nafion is a registered trademark.

The quantity of acrylic acid anhydride or methacrylic acid anhydride is generally selected so that the molar ratio of tetrahydrofuran to acid anhydride is from 1000:1 to 1.5:1 and preferably from 100:1 to 2:1.

The homopolymerization process can be carried out by initially introducing tetrahydrofuran and, optionally, the solvent, subsequently adding the catalyst and the (meth)acrylic acid anhydride and then heating the components to the reaction temperature. The polymer may be varied after the homopolymerization reaction has been stopped by the addition of base, for example sodium carbonate, and the unreacted tetrahydrofuran removed. It is best to carry out the homopolymerization reaction in the absence of oxygen and moisture under which conditions the polymers obtained are stable. The polymers are low viscosity liquids or wax-like solids, depending on their molecular weight. They may be stabilised by the addition of known radical polymerization inhibitors (e.g. phenols and phenothiazine). It is of particular advantage to carry out the polymerization reaction in the presence of radical polymerization inhibitors.

The polymers are crosslinked by the action of light or oxygen and/or by radical-forming initiators and they give products having the properties of rubbers and can be used as rubbers. From the products according to the invention articles for commercial purposes can be manufactured. This products are for example rubber articles like rubber bulbs, rubber bands, rubber packings, rubber tires etc. The products may be used for example for insulating purposes such as insulated electric cables. The uncrosslinked polymers may even be copolymerized with vinyl monomers. In that case, they themselves crosslink the copolymers and thus enable their impact strength to be improved.

EXAMPLE 1

100 ml of $CH_2Cl_2$ were introduced into a flask cooled to %° C. 3 ml of acrylic acid anhydride were added in a countercurrent of nitrogen. 1 ml of $HSbF_6$ (spectroscopically pure) was then injected into the flask to initiate the reaction. The solution was stirred for 15 minutes at 5° C., after which 110 ml of THF were added. After a polymerization time of 3 days (T=10° C.), the reaction was stopped by the addition of saturated soda solution, the reaction mixture was washed with water until it showed a neutral reaction and the reaction product was dried in an oil pump vacuum.

A highly viscous material was obtained, solidifying after 24 hours.

Characteristic values: $M_n=1408$, ester functionality f=1.81, $P_n=18.0$.

The substance was identified by IR-, NMR-spectra and by a gel permeation chromatogram.

EXAMPLE 2

100 ml of $CH_2Cl_2$ were introduced into a flask cooled to 5° C., 110 ml of THF were added and 0.9 ml of $HFbF_6$ was injected into the flask in a countercurrent of nitrogen. After 24 hours, 3 ml of acrylic acid anhydride were added. After a reaction time of another 2 days (T=10° C.), the reaction was terminated by the addition of 100 ml of a saturated soda solution and the resulting reaction mixture was diluted with 200 ml of $CH_2Cl_2$ and washed with water until it showed a neutral reaction. The reaction product was dried in an oil pump vacuum.

A viscous material was obtained, solidifying after 24 hours.

Characteristic values: $M_n = 1337$, ester functionality $f = 1.76$, $P_n = 17.3$ The substance was identified by an IR-spectrum and by a gel permeation chromatogram.

EXAMPLE 3

100 ml of $CH_2Cl_2$, 5 ml of methacrylic acid anhydride and 1.05 ml of $HSbF_6$ were introduced into a flask cooled to 5° C. After 15 minutes, 100 ml of THF were added.

After a polymerization time of 2 days, the reaction was stopped by the addition of 100 ml of a saturated soda solution and the resulting reaction mixture was diluted with 200 ml of $CH_2Cl_2$ and washed with water until it showed a neutral reaction. The reaction product was dried in an oil pump vacuum.

The product has a molecular weight of 1843.

The product was identified as an oligo-THF containing terminal methacrylate groups by an IR-spectrum and an NMR-spectrum and also by a gel permeation chromatogram.

EXAMPLE 4

10 ml of a methacrylic acid anhydride as transfer agent and 0.5 ml of $CF_3SO_3H$ as initiator were added at 5° C. to 185 ml of oxygen-free THF. The reaction temperature was increased to 35° C. After 2 days, a solution of 3 ml of dibutylamine and 102.63 mg of phenothiazine in 30 ml of methylene chloride were added. After 1 hour, another 200 ml of methylene chloride was added. The initiator anion was removed by means of anion exchanger.

The residual solvent and the unused THF were removed in a water jet vacuum. In order to free the substance completely from the solvent, it was treated for 4 hours in a rotary evaporator under an oil pump vacuum. Yield: 121 g.

The substance obtained was a colourless, uncrosslinked product.

It was identified by IR-spectroscopy as a polytetrahydrofuran containing terminal methacrylate groups. Molecular weight: 2182.

EXAMPLE 5

3.5 ml of acrylic acid anhydride and 117.4 mg of 2,6-di-tert.-butyl-4-methyl phenol as stabiliser were added to 195 ml of THF. After cooling to 5° C., 0.2 ml of $HSbF_6$ was added. The reaction temperature was adjusted to 40° C. After a reaction time of 4 days, 0.5 ml of dibutylamine was added to stop polymerization. After stirring for another 2 hours, the reaction solution was poured onto a basic ion exchanger to remove the $SbF_6$-ions present. The residual monomer was then removed in a water jet vacuum and the substance dried in an oil pump vacuum.

The yield of polytetrahydrofuran containing terminal acrylate groups amounts to 107 g. The product has a molecular weight of 2797, an ester functionality of 1.9 and a number average of the degree of polymerization of 37.4.

EXAMPLE 6

3 ml of acrylic acid anhydride were added to 190 ml of tetrahydrofuran. After cooling to 5° C., 0.15 to 0.2 ml of $HSbF_6$ were added. The reaction temperature was adjusted to 40° C.

After a reaction time of 4 days, 0.5 ml of dibutylamine was added to stop polymerization and 114 mg of 2,6-di-tert.-butyl-4-methyl phenol as stabiliser.

After stirring for another 2 hours, the reaction solution was poured onto a basic ion exchanger to remove the $SbF_6$-ions present. The residual monomer was then removed in a water jet vacuum and the substance dried in an oil pump vacuum.

The yield of polytetrahydrofuran containing terminal acrylate groups amounts to 106 g. The product has a molecular weight of 4026, an ester functionality of 1.95–2.0 and a number average of the degree of polymerization of 54.5

EXAMPLE 7

3 ml of acrylic acid anhydride, 114 mg of 2,6-di-tert.-butyl-4-methyl phenol and 0.2 ml of $CF_3SO_3H$ were added to 200 ml of tetrahydrofuran. The reaction temperature was adjusted to 40° C. After a reaction time of 5 days, 0.5 ml of dibutylamine was added to stop polymerization.

After stirring for another 2 hours, the reaction solution was poured onto a basic ion exchanger to remove the $CF_3SO_3$-ions present. The residual monomer was then removed in a water jet vacuum and the substance was dried in an oil pump vacuum.

The yield of polytetrahydrofuran containing terminal acrylate groups was 114 g. The product had a molecular weight of 4462, an ester functionality of 1.85 and a number average of the degree of polymerization of 60.6.

We claim:

1. A process for the production of polytetrahydrofurans, containing terminal acrylate and/or methacrylate groups, wherein tetrahydrofuran, optionally in an inert organic solvent, is homopolymerized at a temperature of from $-10°$ to $+70°$ C., together with 0.1 to 200% by weight, based on the weight of the tetrahydrofuran, of acrylic acid anhydride and/or methacrylic acid anhydride with the aid of from 0.001 to 5.0% by weight, based on tetrahydrofuran, of $HSbF_6$ as catalyst.

2. Process according to claim 1, wherein the tetrahydrofuran is homopolymerized in a first step by itself to form a high molecular weight product which is reacted in a second step with the acrylic acid anhydride and/or methacrylic acid anhydride in the presence of said catalyst in order to reduce its molecular weight and to introduce terminal acrylate and/or methacrylate groups.

* * * * *